Aug. 11, 1925.
J. H. DEPPELER
METHOD OF WELDING METALS
Filed Jan. 22, 1924
1,549,461
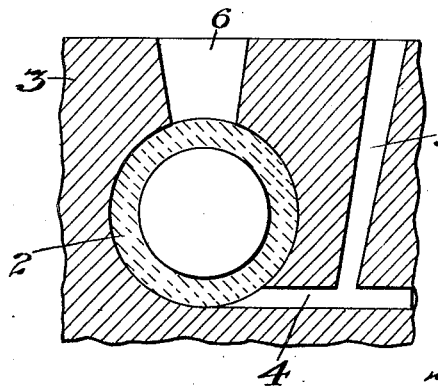
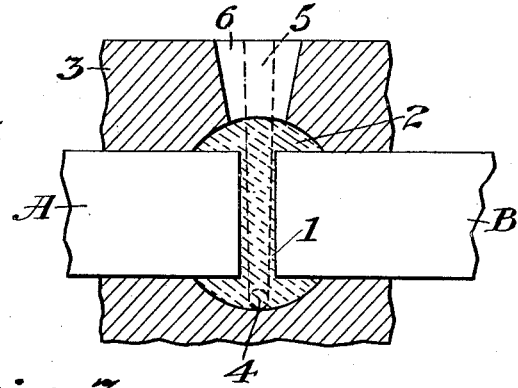
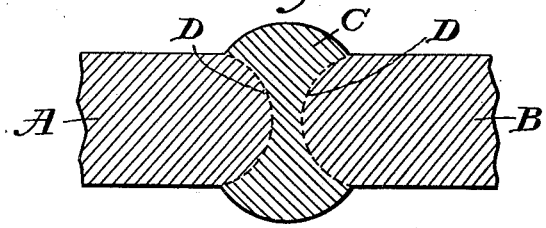
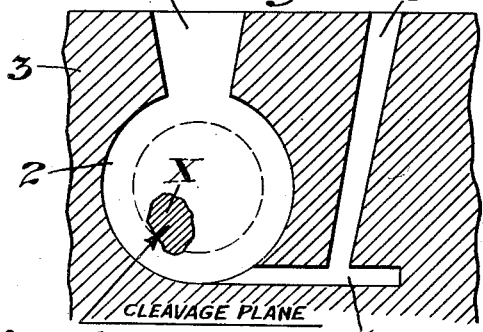
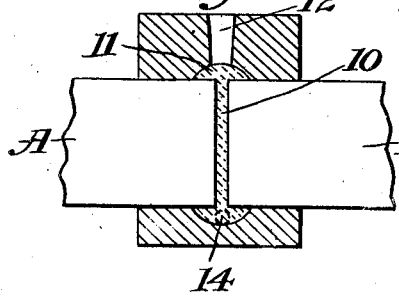
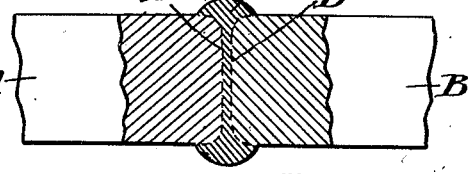
INVENTOR
John H. Deppeler
BY
HIS ATTORNEY Patented Aug. 11, 1925.

1,549,461

UNITED STATES PATENT OFFICE.

JOHN HOWARD DEPPELER, OF WEEHAWKEN, NEW JERSEY, ASSIGNOR TO METAL AND THERMIT CORPORATION, OF CHROME, NEW JERSEY, A CORPORATION OF NEW JERSEY.

METHOD OF WELDING METALS.

Application filed January 22, 1924. Serial No. 687,747.

*To all whom it may concern:*

Be it known that I, JOHN H. DEPPELER, a citizen of the United States, and a resident of Weehawken, in the county of Hudson and State of New Jersey, have invented certain new and useful Improvements in Methods of Welding Metals; and I do hereby declare the following to be a full, clear, and exact description of the invention, such as will enable others skilled in the art to which it appertains to make and use the same.

My invention relates to an improvement in the regular thermit welding practice and has to do with the design and proportioning of the space between the metal pieces to be welded, the collar of metal surrounding the ends of the metal pieces, and the dimensions of the sink head or riser necessary to feed the shrinkage of this molten metal and to act as a reservoir for any surplus.

The invention is illustrated in the accompanying drawings, in which:

Fig. 1 is a sectional elevation of a thermit weld mold formed in accordance with former practice.

Fig 2 is a section at right angles to that in Fig. 1, showing the ends of the pieces to be joined within the mold.

Fig. 3 is a longitudinal section through a welded joint formed in the mold shown in Figs. 1 and 2.

Fig. 4 is a conventional representation of the joint with the mold still in position, indicating a common form of shrinkage defect.

Fig. 5 is a view similar to Fig. 2 illustrating a form of mold for practicing the instant invention; and Fig. 6 is a view similar to Fig. 3 showing the improved joint.

Heretofore, the general proportions used have been approximately as follows:

The space or gap between the ends of the metal pieces was equal to approximately one-fourth the diameter or thickness of the pieces. The collar around the joint at the weld was approximately the shape of a segment of a circle, the length of the cord of which was equal to the thickness or diameter of the piece, and the perpendicular distance from the center of this cord to the arc of the circle was approximately equal to one-fourth the length of the cord, or in turn equal to the gap. As an illustration, in the welding of a 12" x 12" section, a gap 1 between the ends of the pieces A, B was provided of about 3". This space was then filled with wax and the wax was built or molded on to the outsides of the pieces to form a collar, as at 2, with roughly a segment of a circle in cross section. The wax extended about 6" either side of the center line of the gap and the thickness of the wax at its mid-point was approximately 3". After this, a refractory mold 3 was rammed completely surrounding the ends of the pieces and including this waxed portion, and a wooden pattern of a slightly tapered heating gate 4 was placed near the bottom, the pattern of the pouring gate 5 joining with this; and at some point approximately above the center of the mass, a pattern of a riser 6 was placed whose cross section at the bottom in the case of the example given above would have been at least 6" x 6". This arrangement is shown in Figs. 1 and 2.

The weld was then made, after removing the wooden patterns of the heating gate, pouring gate and riser, by heating the interior of the mold with a burner using gas and air—or oil vapor and air—which heating served to melt out the wax thoroughly, dry out and bake the interior of the mold and bring the sections up to approximately a red heat or above by which they were properly expanded. After this, the heating gate was plugged, superheated thermit iron or steel made a crucible mounted over the pouring gate and this superheated metal tapped into the mold. This fused the sections for approximately the full width of the collar, and this fused metal with the molten steel upon solidification strongly united the pieces.

In this practice, the longitudinal cross section of the pieces A, B and weld material C was approximately as shown in Figure 3, with the fusion lines approximately as indicated by the dotted lines D.

In making research to discover means of increasing the strength of thermit welds and of eliminating all defects, a defect was discovered, which I have termed "cleavage plane," and which existed in all such welds at the place just below the center and back from the heating gate, as shown at X in Figure 4. In this area, it was evident that the metal upon solidification had torn itself apart so that a fracture through the weld at this point would show no fusion from one piece to the other, and this entire area would appear brownish and evidently discolored by oxidation or otherwise, and at this area would entirely lack the usual silvery, crystalline fracture. Longitudinal test pieces taken at the middle of this area would fall apart when being machined and the strength of such test pieces would gradually increase as the place from which they were taken increased in distance from the middle of this area. This cleavage plane was evidently caused by the difference in shrinkage of various parts of the molten or fused mass during solidification; and various modifications of the shape of the pieces at the ends, the design and dimensions of the collar, and the proportioning of the various parts, were tried out with a view to overcoming this serious defect.

My invention has to do with the proportioning of the collar, riser and gap, which I have found most beneficial in accomplishing this purpose. In my improved method, I have reduced the gap or space between the ends of the pieces and at the same time considerably reduced the dimensions of the collar and the cross section at the base of the riser so as to eliminate as far as practical the differences in length of this molten or fused area and, therefore, the curvature of the fusion lines, which has resulted in a more uniform shrinkage of the molten or fused material with the consequent elimination of the defect or "cleavage plane".

As an example, in the 12″ x 12″ section mentioned above, the approximate dimensions which would be used and which would eliminate this defect would be as follows, see Fig. 5:

Gap or space 10 between the ends of the pieces ¾″ to 1″; collar space 11, whose section was still approximately a segment of a circle, 6″ long x 1½″ thick at center; and a riser 12 with a cross section at the base 2″ x 2″ or less.

These proportions, therefore, would be approximately as shown in Figure 5, and the flattened fusion lines D′, D′ approximately as shown in Figure 6.

As indicated, the transverse dimensions of the space between the parts to be welded, the space defining the collar, and the dimensions of the riser where the latter joins the mold cavity, have been so far reduced and substantially equalized as to avoid such a preponderance of molten metal at any point as would result in shrinkage stresses when the molten metal cools.

In the practice of my improved method, the ends of the parts to be welded and the interior of the mold are heated as heretofore by means of a flame introduced through a heating gate 14 and, when this preheating has been carried out to the desired degree, the heating gate is closed and the molten metal tapped into the mold by way of the customary pouring gate. The superheated metal quickly fills all of the spaces in the mold cavity, but, as the thickness of the body of molten metal in the several cavities is not materially variant, the cooling of the metal will be practically uniform throughout and no internal stresses will be set up to impair the joint.

What I claim is:

1. The method of forming thermit welds in molds, which comprises so proportioning the space forming the gap between the parts to be welded and the space defining the collar surrounding said parts as to avoid such a preponderance of molten metal at any point as would result in shrinkage stresses, and pouring the molten metal into the mold.

2. The method of forming thermit welds in molds, which comprises so proportioning the space forming the gap between the parts to be welded, the space defining the collar surrounding said parts and the riser opening into the mold, as to avoid such a preponderance of molten metal at any point as would result in shrinkage stresses, and pouring the molten metal into the mold.

3. The method of forming thermit welds in molds, which comprises so proportioning the space forming the gap between the parts to be welded and the space defining the collar surrounding said parts as to avoid such a preponderance of molten metal at any point as would result in shrinkage stresses, introducing a preheating medium into the mold, and then pouring the molten metal into the mold.

4. The method of forming thermit welds in molds, which comprises so proportioning the metal receiving spaces with reference to the diameter of the pieces to be welded that the gap will be one-twelfth, the base of the collar one-half and the amplitude of the collar one-eighth, respectively and approximately of said diameter, thereby avoiding a preponderance of molten metal in any of said spaces, and pouring molten metal into the mold.

5. The method of forming thermit welds in molds, which comprises so proportioning the metal receiving spaces with reference to the diameter of the pieces to be welded that the gap will be one-twelfth, the base of the collar one-half, the amplitude of the collar one-eighth and the width of the riser onesixth, respectively and approximately of said diameter, thereby avoiding a preponderance of molten metal in any of said spaces, and pouring molten metal into the mold.

6. The method of forming thermit welds in molds, which comprises so proportioning the metal receiving spaces with reference to the diameter of the pieces to be welded that the gap will be one-twelfth, the base of the collar one-half and the amplitude of the collar one-eighth, respectively and approximately of said diameter, thereby avoiding a preponderance of molten metal in any of said spaces, introducing a preheating medium into the mold, and then pouring the molten metal into the mold.

In testimony whereof I affix my signature.

JOHN HOWARD DEPPELER.